United States Patent
Chalopin et al.

(10) Patent No.: US 8,576,904 B2
(45) Date of Patent: Nov. 5, 2013

(54) METHOD AND DEVICE FOR PROCESSING A PULSE TRAIN OF A MODULATED SIGNAL, IN PARTICULAR AN ULTRA WIDEBAND SIGNAL MODULATED BY A DIGITAL PULSE INTERVAL MODULATION

(75) Inventors: Hervé Chalopin, Aubagne (FR); Anne Collard-Bovy, Bouc Bel Air (FR); Philippe Courmontagne, Belgentier (FR)

(73) Assignees: STMicrolelectronics (Rousset) SAS, Rousset (FR); Universite de Provence Aix Marseille I, Marseilles (FR)

( * ) Notice: Subject to any disclaimer, the term of this patent is extended or adjusted under 35 U.S.C. 154(b) by 832 days.

(21) Appl. No.: 12/165,868

(22) Filed: Jul. 1, 2008

(65) Prior Publication Data
US 2009/0010321 A1 Jan. 8, 2009

(30) Foreign Application Priority Data
Jul. 2, 2007 (FR) ..................................... 07 56215

(51) Int. Cl.
*H03K 7/08* (2006.01)
(52) U.S. Cl.
USPC ............................ 375/238; 375/237; 375/239
(58) Field of Classification Search
USPC .................................. 375/130, 239, 343, 346
See application file for complete search history.

(56) References Cited

U.S. PATENT DOCUMENTS

| 4,007,330 | A | * | 2/1977 | Winters .......................... 375/343 |
| 4,672,638 | A | | 6/1987 | Taguchi et al. ................ 375/346 |
| 5,023,888 | A | | 6/1991 | Bayston ........................... 375/23 |
| 6,208,182 | B1 | | 3/2001 | Marbot et al. |
| 6,959,031 | B2 | * | 10/2005 | Haynes et al. ................. 375/130 |
| 6,970,496 | B1 | * | 11/2005 | Ben-Bassat et al. .......... 375/141 |
| 7,822,152 | B2 | * | 10/2010 | Inagawa et al. ............... 375/343 |
| 2004/0042561 | A1 | | 3/2004 | Ho et al. ........................ 375/316 |
| 2004/0136439 | A1 | | 7/2004 | Dewberry ...................... 375/130 |
| 2008/0025386 | A1 | * | 1/2008 | Desset et al. .................. 375/239 |

FOREIGN PATENT DOCUMENTS

EP 0843418 5/1998

OTHER PUBLICATIONS

O'Donnell et al., "An Ultra-Wideband Transceiver Architecture for Low Power, Low Rate, Wireless Systems", IEEE Transactions on Vehicular Technology, vol. 54, No. 5, Sep. 2005, pp. 1623-1631.

* cited by examiner

*Primary Examiner* — Sam K Ahn
*Assistant Examiner* — Janice Tieu
(74) *Attorney, Agent, or Firm* — Allen, Dyer, Doppelt, Milbrath & Gilchrist, P.A.

(57) ABSTRACT

The pulse train of a signal is modulated by a DPIM modulation involving a discrete random time parameter. A first processing is performed on the signal to deliver a sampled signal. A second processing is performed on the sampled signal, comprising a correlation processing including at least one elementary correlation processing with a correlation mask corresponding to the shape of at least part of a sampled pulse, and delivering second information items. A third processing is performed for detecting the pulses following a first pulse by taking account of the position of the first pulse, on packets of second information items, which are separated by a duration related to the discrete random parameter.

24 Claims, 13 Drawing Sheets

PULSE OVER
TRUNCATION ZONE

POS

| 7 | 23 | 39 | 55 | 71 | 87 | 103 | 119 | 135 | 151 | 167 | 183 | 199 | 215 | 231 | 247 |

| 4 | 20 | 36 | 52 | 68 | 84 | 100 | 116 | 132 | 148 | 164 | 180 | 196 | 212 | 228 | 244 |
|---|----|----|----|----|----|-----|-----|-----|-----|-----|-----|-----|-----|-----|-----|
| 5 | 21 | 37 | 53 | 69 | 85 | 101 | 117 | 133 | 149 | 165 | 181 | 197 | 213 | 229 | 245 |
| 6 | 22 | 38 | 54 | 70 | 86 | 102 | 118 | 134 | 150 | 166 | 182 | 198 | 214 | 230 | 246 |
| 7 | 23 | 39 | 55 | 71 | 87 | 103 | 119 | 135 | 151 | 167 | 183 | 199 | 215 | 231 | 247 |
| 8 | 24 | 40 | 56 | 72 | 88 | 104 | 120 | 136 | 152 | 168 | 184 | 200 | 216 | 232 | 248 |
| 9 | 25 | 41 | 57 | 73 | 89 | 105 | 121 | 137 | 153 | 169 | 185 | 201 | 217 | 233 | 249 |
| 10 | 26 | 42 | 58 | 74 | 90 | 106 | 122 | 138 | 154 | 170 | 186 | 202 | 218 | 234 | 250 |

| 0 | ← P(0) |
| 0 | |
| 0 | |
| 0 | ⋮ |
| 1 | ← P(4) |
| 0 | |
| 0 | |
| 1 | ← P(7) |
| 0 | |
| 0 | |
| 0 | |
| 1 | ← P(11) |
| 0 | |
| 0 | ⋮ |
| 0 | |
| 1 | ← P(15) |

FIG. 16

METHOD AND DEVICE FOR PROCESSING A PULSE TRAIN OF A MODULATED SIGNAL, IN PARTICULAR AN ULTRA WIDEBAND SIGNAL MODULATED BY A DIGITAL PULSE INTERVAL MODULATION

FIELD OF THE INVENTION

The invention relates to the processing of a pulse signal modulated by a modulation involving a discrete random time parameter. A nonlimiting example of such a signal is an ultra wideband (UWB) pulse signal modulated by a digital pulse interval modulation, well known to the person skilled in the art by the abbreviation "DPIM". Such a modulated signal conveys coded digital information, and the invention applies advantageously but nonlimitingly, to the transmission and decoding of such information within the framework of a local wireless transmission network.

BACKGROUND OF THE INVENTION

Ultra wideband-type technology is distinguished from narrowband and spread spectrum technologies in the sense that the bandwidth of the signal of ultra wideband type is typically between about 25% and about 100% of the central frequency, or else is greater than 1.5 GHz. Moreover, instead of transmitting a continuous carrier modulated with information or with information combined with a spreading code, which determines the bandwidth of the signal, ultra wideband technology involves the transmission of a series of very narrow pulses. For example, these pulses may take the form of a single cycle, or monocycle, having a pulse width of less than 1 ns. These pulses that are extremely short in the time domain, when transformed into the frequency domain, produce the ultra wideband spectrum that is characteristic of UWB technology.

In UWB technology, the information conveyed on the signal may be coded, for example, by a digital pulse interval modulation (DPIM). With such a modulation, the value of the spacing between two consecutive pulses of the pulse train codes the value of the information. Furthermore, each of the possible spacings is an integer multiple of a base duration. The decoding of the pulse train comprises, in particular, the detecting of the positions of the various pulses so as to determine the values of the durations separating them.

SUMMARY OF THE INVENTION

According to one mode of implementation, there is provided a method and a device for processing a pulse train of a signal modulated by a modulation involving a discrete random time parameter, in particular a UWB signal modulated by DPIM modulation, allowing low-cost integration with low power consumption.

According to another embodiment, there is provided a method and a device to process a sizeable set of information in a structure operating, for example, at a few hundred MHz, while retaining the essence of a correlation-based filtering and circumventing certain disturbing noise, and while decreasing the impact of a processing on the surface area of the data bus.

According to one aspect, there is provided a method of processing a pulse train of a signal modulated by modulation involving a discrete random time parameter. This method comprises a first processing on the signal delivering a sampled signal and a second processing performed on the sampled signal and delivering second information items. This second processing comprises a correlation processing including at least one elementary correlation processing with a correlation mask corresponding to the shape of at least part of a sampled pulse.

The processing method also comprises a third processing detecting the pulses following a first pulse, this third processing being performed by taking account of the position of the first pulse, on packets of second information items, which packets are separated by a duration related to the discrete random parameter. A discrete random time parameter is a parameter for which only a few choices regarding this parameter are possible and determinable in advance.

Thus, a detection of the pulses performed only on information packets and not on the whole set of correlation values allows low-consumption, low-cost integration and also makes it possible to circumvent certain disturbing noise outside of the packets.

According to another mode of implementation, the correlation processing delivers correlation values, and the second processing further comprises a processing for thresholding the correlation values with a threshold value, the second information items being binary information items corresponding to the threshold correlation values.

Although the method applies to a signal modulated by a modulation involving a discrete random time parameter, such as a digital pulse position modulation (DPPM), an interesting application relates to a UWB signal modulated by a digital pulse interval modulation (DPIM modulation), in which the theoretical interval between two pulses is an integer multiple of a base duration.

In this case, the packets of second information items on which the presence or the absence of pulses is detected are separated by the base duration, and as will be seen hereinbelow, by a number of samples (or of second information items) equal to the ratio between the base duration and a sampling period.

For a UWB signal which occupies, for example, a frequency band 6-10 GHz, it is necessary, in view of the Shannon-Nyquist criterion, to sample the signal at a sampling frequency of at least 20 GHz, and preferably 40 GHz, this making it helpful to resort to an analog-digital converter whose sampling frequency is of the order of several tens of GHz, i.e. one sample every 50 pico seconds at least.

Now, at present, the embodying of such a component in CMOS technology presents difficulties. Hence, one approach includes performing a serial/parallel conversion of the analog signal so that the first processing delivers successive groups of samples of the signal in parallel. This serial/parallel conversion may, for example, be carried out with a bank of analogue-digital converters phase-shifted by the desired sampling period and clocked at lower frequencies (for example, of the order of a hundred or a few hundred MHz). The first processing thus delivers successive groups of samples of the signal in parallel and the correlation processing is performed on the successive groups of samples and delivers successive blocks of correlation values.

According to one mode of implementation, the thresholding processing comprises thresholding operations performed respectively in parallel on the correlation values of each block with the threshold value, so as to deliver successive blocks of second information items.

According to another mode of implementation, two consecutive packets of second information items in each block of second information items are shifted by K second information items, K being equal to the ratio between the sampling period and the base duration.

The third processing then delivers for each block of N second information items, N/K binary information items respectively representative of N/K possible positions of the pulses, the logic value of a binary cue defining the presence or the absence of a pulse at the corresponding position.

In order to reduce the loss of information resulting from a serial/parallel conversion of the signal, in particular when a pulse is situated in a truncation zone, it is advantageous for the first processing to further comprise an initial processing for sampling the signal delivering successive blocks of N samples in parallel, and a storage processing performing successive storings of the $M_m-1$ last samples of the blocks, $M_m$ being the number of samples (called "mask samples") of the correlation mask.

Thus, each current group of samples comprises the $M_m-1$ stored samples of the previous block followed by the N samples of the current block.

According to one mode of implementation, the elementary correlation processing comprises N correlations in parallel performed on each group of $N+M_m-1$ samples with the correlation mask and delivers for each group of samples a block of N initial correlation values. The correlation values may be the initial correlation values.

This said, the correlation values may result from a summation of several homologous initial correlation values resulting from several elementary correlation processings performed in parallel with the aid of several different correlation masks. This is particularly advantageous when the shape of the pulses of the signal varies according to the distance at which the signal has been emitted.

Instead of permanently detecting this distance between the emitter and the receiver so as to choose a suitable correlation mask, it is preferable to define several correlation masks (two masks may suffice) corresponding respectively to at least part of several sampled pulses of the signal respectively emitted at several distances of different values. These masks may be defined so that the sum of the maxima of intercorrelations performed respectively between the various correlation masks and the various shapes of sampled pulses is substantially constant over an interval including all the values of the distances.

In this case, the correlation processing comprises several elementary correlation processings respectively performed with the correlation masks, each elementary correlation processing delivering initial correlation values. A summation of the similar homologous initial correlation values respectively delivered by the elementary correlation processings is then performed in such a way as to obtain the correlation values.

According to another aspect, there is provided a device for processing a pulse train of a signal modulated by modulation involving a discrete random time parameter. The device may comprise an input for receiving the signal, and first processing means or first circuitry coupled to the input and able to deliver a sampled signal. Memory means or a memory store at least one correlation mask corresponding to the shape of at least part of a sampled pulse. Second processing means or second circuitry are coupled to the output of the first processing means, possessing an output able to deliver second information items, and comprising correlation processing means or circuitry including at least one elementary processing means or circuit able to perform an elementary correlation processing of the sampled signal with the correlation mask. Third processing means or third processing circuit are able to detect the pulses following a first pulse by taking account of the position of the first pulse, on packets of second information items, which packets are separated by a duration related to the discrete random parameter.

According to one embodiment, the correlation processing means are able to deliver correlation values, and the second processing means furthermore comprise thresholding means able to compare the correlation values with a threshold value and to deliver binary information items in the guise of second information items.

According to an embodiment in which the signal is a UWB signal modulated by DPIM modulation, the first processing means are able to deliver successive groups of samples of the signal in parallel. The correlation processing means are able to perform correlation processing on the successive groups of samples and deliver successive blocks of correlation values, and the duration is equal to the base duration.

The thresholding means may comprise comparators in parallel able to respectively compare the correlation values of each block with the threshold value, so as to deliver successive blocks of second information items.

Two consecutive packets of second information items in each block of second information items may be shifted by K second information items, K being equal to the ratio between the sampling period and the base duration, and the third processing means may deliver for each block of N second information items, N/K binary information items respectively representative of N/K possible positions of the pulses, the logic value of a binary cue defining the presence or the absence of a pulse at the corresponding position.

The correlation mask may comprise $M_m$ mask samples. The first processing means may comprise sampling means delivering successive blocks of N samples in parallel, and a memory able to successively store the $M_m-1$ last samples of the blocks. Each current group of samples may be able to be delivered by the first processing means advantageously comprises the $M_m-1$ stored samples of the previous block, which are followed by the N samples of the current block.

The elementary processing means of a wireless transmission system, for example a UWB receiver, may be able to perform, for example, N correlations in parallel on each group of $N+M_m-1$ samples with the correlation mask, and to deliver for each group of samples a block of N initial correlation values.

According to a variant, the correlation values are the initial correlation values. According to another variant in which the shape of the pulses of the signal varies according to the distance at which the signal was emitted, the memory means may be able to store several correlation masks corresponding respectively to at least part of several sampled pulses of the signal respectively emitted at several distances of different values, so that the sum of the maxima of intercorrelations performed respectively between the various correlation masks and the various shapes of sampled pulses is substantially constant over an interval including all the values of the distances. The correlation processing means may then comprise several elementary processing means able to respectively perform elementary correlation processings with the correlation masks and to each deliver initial correlation values, as well as summation means connected to the outputs of the elementary processing means and able to deliver the correlation values.

The device may comprise, for example, a signal processor incorporating the second and the third processing means. According to another embodiment, there is a receiver of a wireless transmission system, for example a UWB receiver, comprising a processing device as defined above.

BRIEF DESCRIPTION OF THE DRAWINGS

Other advantages and characteristics will become apparent upon an examination of the detailed description of wholly nonlimiting modes of implementation and embodiments, and the appended drawings in which:

FIGS. 14 to 16 illustrate an example of packet-based pulse detection, in accordance with the present invention;

DETAILED DESCRIPTION OF THE PREFERRED EMBODIMENTS

An exemplary implementation and embodiment applied to a UWB signal modulated by a DPIM modulation will now be described while referring to the figures, although the invention is not limited to this type of particular application but relates in a more general manner to a modulation involving a discrete random time parameter, that is to say a parameter capable of taking only a few possible values determinable in advance.

Figure 1:
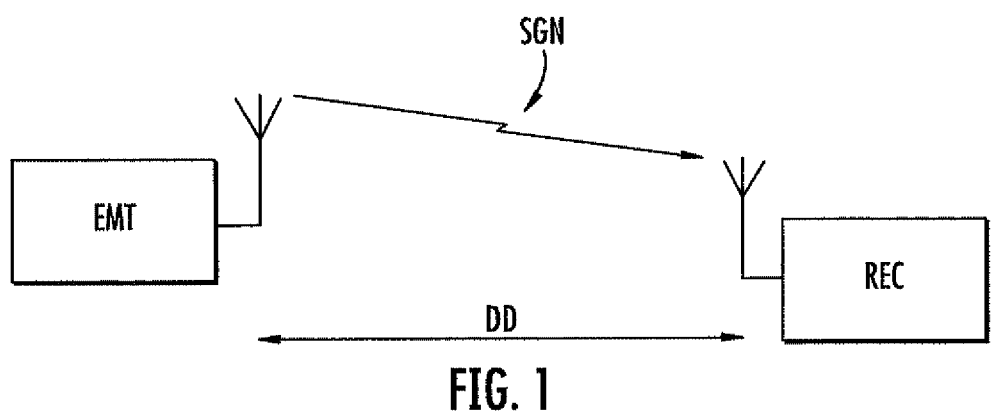
FIG. 1 schematically represents an emitter and a receiver of a wireless communication system, in accordance with the present invention.

In FIG. 1, the reference EMT denotes an emitter for a wireless communication system transmitting to a receiver REC a signal SGN of the UWB type modulated by DPIM modulation. Additionally, the emitter and the receiver are separated by a distance DD.

Figure 2:
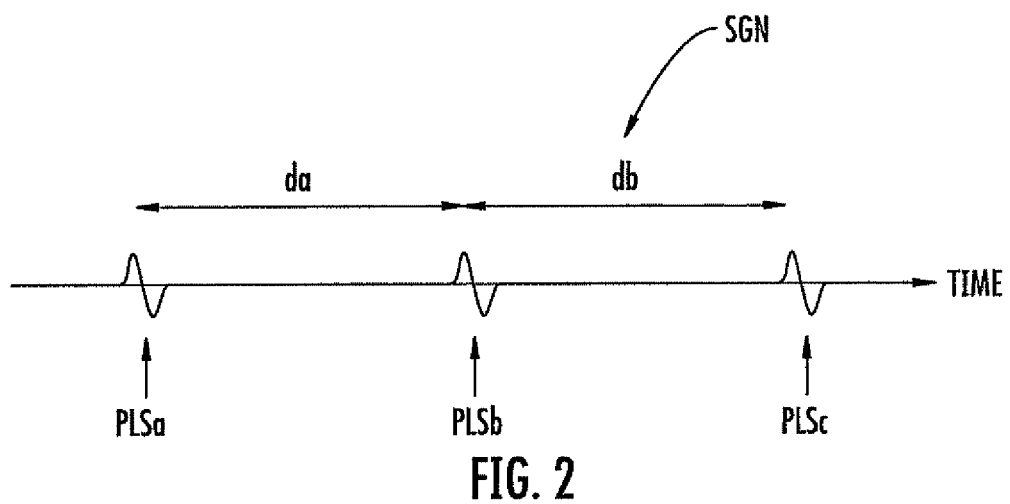
FIG. 2 illustrates a DPIM modulation, in accordance with the present invention.

In FIG. 2, it is seen that the signal SGN comprises a pulse train, three of whose pulses, referenced PLSa, PLSb, PLSc, have been represented for the sake of simplification. The width of such a pulse is of the order of from 1 to 2 nanoseconds. The signal conveys coded information. The value of the interval (da, db) between two pulses codes the value of an information item. Thus, p information items are coded with the aid of p+1 pulses. Furthermore, the theoretical interval between two pulses is an integer multiple of a base duration $T_{mod}$.

This base duration $T_{mod}$ is, for example, equal to 400 picoseconds. The various possible time intervals $d_i$ are equal to $(n+i) T_{mod}$. Thus, by way of example, if the various information items can take the values 0, 1, 2 or 3, that is to say in binary 00, 01, 10, 11, then a pulse separated from the previous one by an interval $d_0$ equal to $3T_{mod}$ will correspond to a value 0 for the cue. An interval $d_1$ equal to $4T_{mod}$ will correspond to a value 1 for the cue. An interval $d_2$ equal to $5T_{mod}$ will correspond to a value 2 for the cue and an interval $d_3$ equal to $6T_{mod}$ will correspond to a value 3 for the cue.

The pulses PLS possess characteristics of a pulse of the ultrawideband type in the sense that the ratio of the bandwidth of the pulse at mid-power to the central frequency is greater than a quarter, or else that the bandwidth at mid-power is greater than 1.5 GHz. By way of indication, the central frequency of a pulse may be equal to several GHz.

Figure 4:
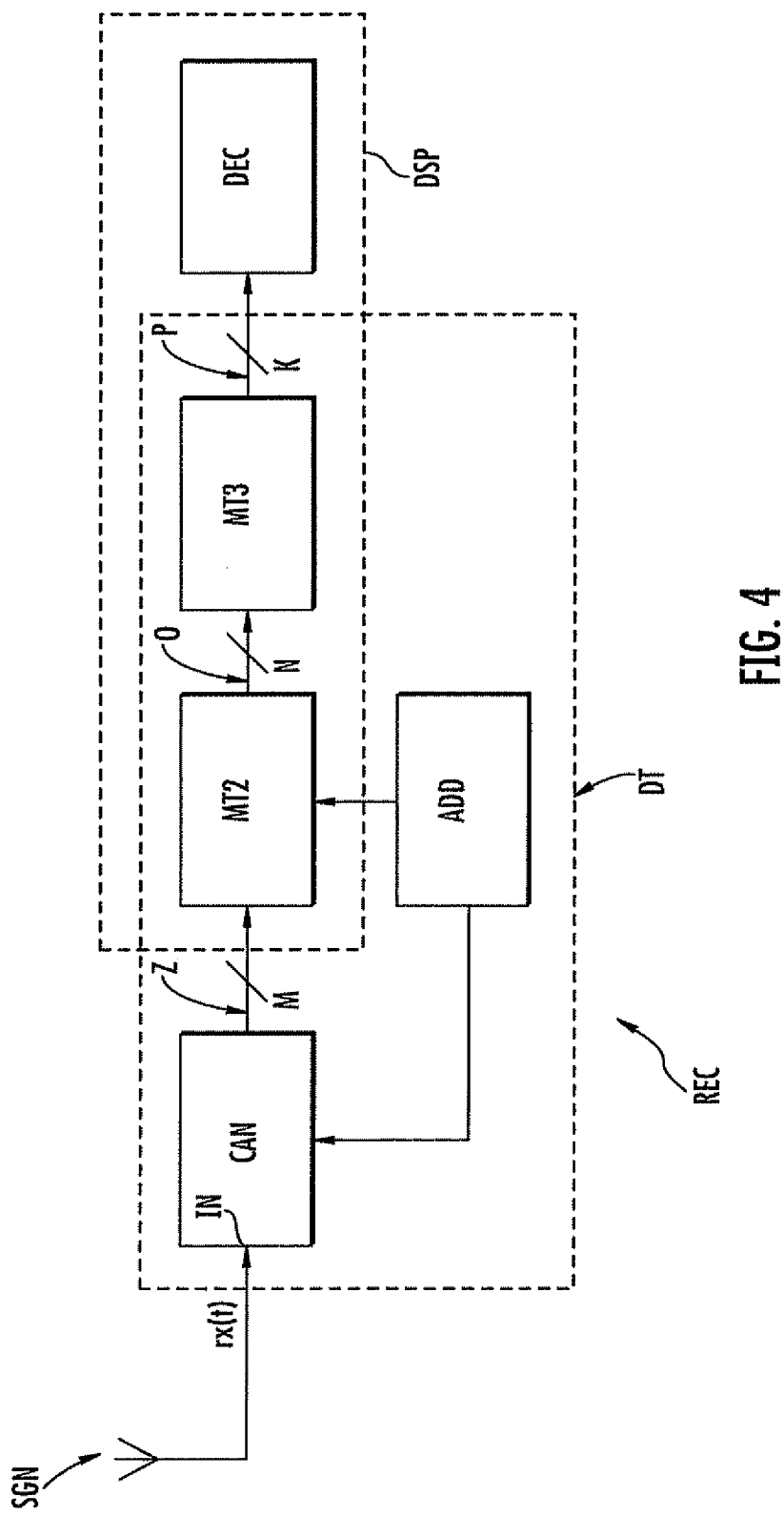
FIG. 4 schematically illustrates an embodiment of a receiver of FIG. 1.

As illustrated in FIG. 4, the receiver REC comprises an antenna receiving the signal SGN after transmission on a transmission channel which may be multipath. After entering the antenna and passing through the various conventional elements of an analogue reception chain, such as a low noise amplifier, the temporal pulse signal rx, resulting from the signal SGN, is delivered at the input IN of the processing device DT. This input IN is in fact the input of first processing means or circuitry CAN.

The signal rx is also a pulse signal. However, the shape of the pulses forming this signal rx may be different from the shape of the pulses of the signal SGN as a function of the characteristics of the reception means or circuitry, in particular of the antenna. Stated otherwise, each pulse of the signal rx is in fact the theoretical response of the system to the receipt of a pulse of the signal SGN, and this theoretical response may vary as a function of the characteristics of the reception means or circuitry, and disturbances induced by the transmission channel (ambient noise and multipath).

Figure 3:
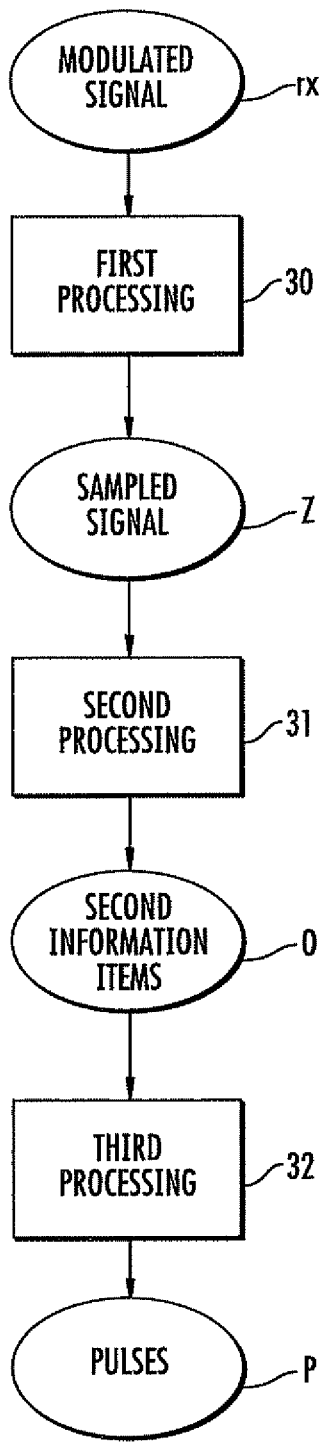
FIG. 3 schematically illustrates the main steps of a method of implementing a method of processing a signal modulated with a modulation involving a discrete random time parameter, in accordance with the present invention.

As illustrated in FIG. 3, the modulated signal rx undergoes a first processing 30 delivering a sampled signal Z. A second processing 31 is performed on the sampled signal Z to deliver second information items O on which a third processing 32 is performed, making it possible to detect the pulses which follow a first pulse. This processing is, as will be seen in greater detail hereinafter, performed by taking account of the position of the first pulse, on packets of second information items, which packets are separated by a duration equal to the base duration $T_{mod}$.

Likewise, as will be seen in greater detail hereinbelow, in one exemplary embodiment, the position of the pulses as well as the presence or the absence of pulses at these possible positions is defined by a binary information bus P. The second processing 31 comprises, as will be seen in greater detail hereinafter, a correlation processing including at least one elementary correlation processing with a correlation mask corresponding to the shape of at least part of a sampled pulse.

Hardware-wise, the means or circuitry allowing the implementation of this method are incorporated within a processing device DT, such as that illustrated schematically in FIG. 4. The first processing means CAN are able to perform the first processing. A signal processor DSP can incorporate in software fashion the second processing means or circuitry MT2 and the third processing means or circuitry MT3, able respectively to perform the second and third processings 31 and 32.

A decoding module DEC, incorporated likewise within the processor DSP, allows the decoding of the information conveyed by the signal SON having regard to the values of the intervals separating the various pulses detected. The processing device DT further comprises a memory MM capable of storing at least one correlation mask.

Figure 5:
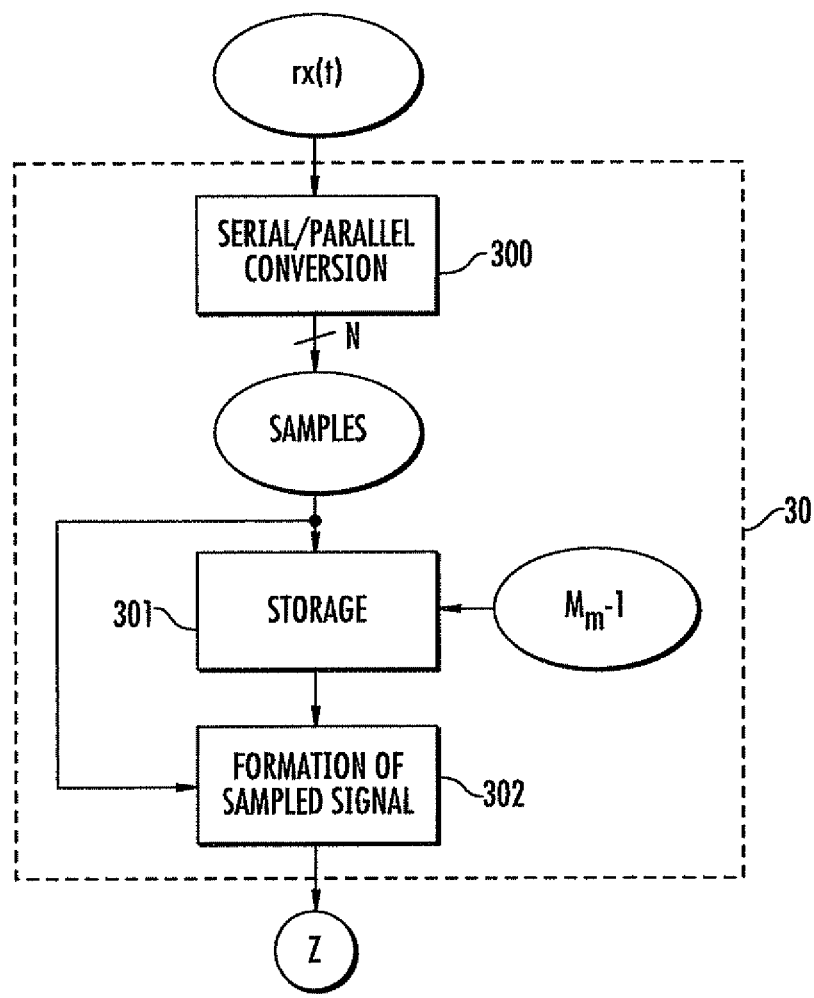
FIGS. 5 to 13 illustrate in greater detail but still schematically various aspects of the method and of the device illustrated in FIGS. 3 and 4 respectively.

An exemplary first processing 30 is illustrated more particularly in FIG. 5. This comprises a serial/parallel conversion 300 of the signal rx, which is akin to an initial sampling processing delivering successive blocks of samples in parallel, for example successive blocks of N samples.

Figure 7:
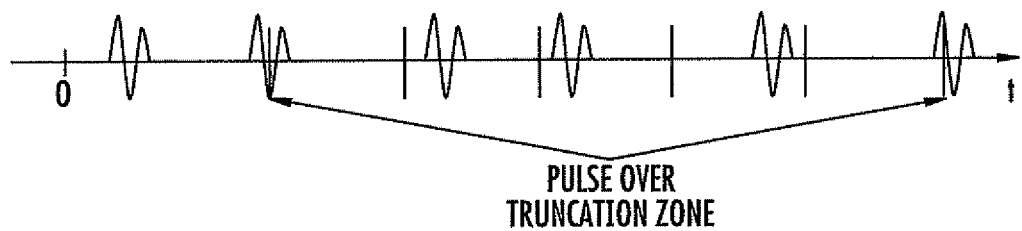

Separating a signal into several parallel blocks, which amounts to a serial/parallel conversion, may lead to a loss of information in the case where a pulse of the signal is situated at the site of separation or truncation zone, as illustrated in FIG. 7. Hence, there is provided a storage processing 301 performing successive storings of the $M_m-1$ last samples of the blocks of samples. Here, $M_m-1$ represents the size, decreased by one sample, in number of samples of the correlation mask which will be used.

The formation 302 of the sampled signal Z then comprises the formation of successive groups of $N+M_m-1$ samples. More precisely, a current group of samples of the signal Z comprises the $M_m-1$ stored samples of the previous block, followed by the N samples of the current block delivered on completion of the initial sampling processing 300.

Thus, the first processing 30 is globally a serial/parallel conversion which delivers a sampled signal Z formed of a succession of groups of samples, each group of samples here comprising $N+M_m-1$ samples. The samples may be coded on a certain number of bits depending on the quantization. This said, by way of example, the case of a quantization on two bits will be described here.

Figure 6:
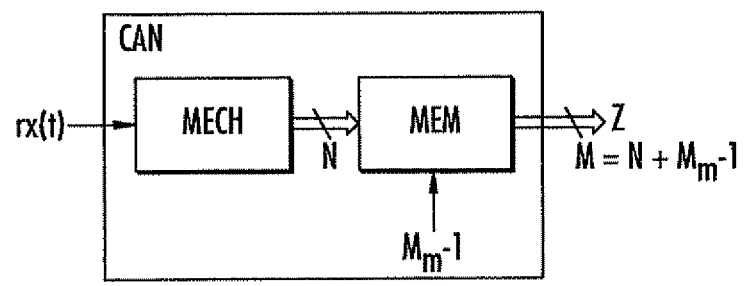

Thus, each sample takes values from among the values −1, 0 and 1. Their respective binary values are 11, 00, 01. And, in this precise case, the high-order bit represents the sign of the sample. Hardware-wise, the first processing means or circuitry CAN may be embodied as illustrated in FIG. 6. More precisely, sampling means or circuitry MECH deliver the successive blocks of N samples in parallel, and a memory MEM is provided for temporarily storing the $M_m-1$ last samples of each block with a view to forming each group of M samples, M being equal to $N+M_m-1$.

When the central frequency of the pulses of the signal rx is of the order to several GHz, the respective sampling frequency of the signal is preferably of the order of several tens of GHz. An approach allowing the embodiment of such means in CMOS technology may include the use of a bank of N analogue-digital converters, each clocked at a lower frequency Fe, for example of the order of a hundred MHz, and mutually phase-shifted by a time offset equal to 1/N.Fe.

Thus, the effective sample frequency is equal to N.Fe. By way of indication, if N is equal to 256, and if each analogue-digital converter samples at Fe=156.25 MHz, a multiphased sampling with an effective sampling frequency N.Fe equal to 40 GHz is obtained. Another possible approach is of the type illustrated in FIGS. 8 and 9. It provides for the use of D flip-flops.

The signal rx (t) is delivered into a comparison means COMP1 (FIG. 8) so as to be compared with a reference voltage Vr, for example zero voltage, so as to deliver a signal SGI capable of taking three logic states "+1", "0", "−1" as a function of the level of the signal rx with respect to the reference value Vr. The sampling means MECH comprise a programmable clock circuit CHP receiving a base clock signal CLKe having the frequency Fe and delivering N elementary clock signals CLK1-CLKN having the same frequency Fe but mutually temporally offset by 1/N.Fe.

The means MECH also comprise N D-type flip-flops, respectively referenced FF1-FFN. These flip-flops are respectively controlled by the N elementary clock signals CLK1-CLKN and they receive the signal SGI as input. In tempo with the successive rising edges of the various elementary clock signals CLK1-CLKN, the signal SGI will therefore be sampled and the N successive samples will be stored in an output register BF controlled by the base clock signal at CLKe. On each rising edge of this base clock signal CLKe (the rising edges being spaced apart by a duration Te representing the period of this base clock signal), the N samples will be delivered in parallel.

In practice, the programmable clock circuit CHP may comprise a clock, for example a quartz, and a certain number of delay elements arranged in series at the output of the clock. In this regard, the person skilled in the art will, if desired, refer to European Patent Application No. 0 843, 418.

One of the difficulties of this sampling at very high frequency resides in the fact that the elementary clock signals may be delivered with a precision ("jitter") which is very low, for example of the order of a few picoseconds. This is the reason why it is then advantageous for the programmable clock circuit CHP to comprise a digital phase-locked loop comprising (FIG. 9), for example a programmable ring oscillator OSC2, for delivering the N elementary clock signals CLK1-CLKN. This ring oscillator is controlled on the basis of a control circuit CCD receiving the respective outputs from N flip-flops BS1-BSN. These N flip-flops are respectively controlled by the N elementary clock signals CLK1, CLKN and receive on their D input the base clock signal CLKe emanating, for example, from a conventional quartz oscillator OSC1.

The person skilled in the art may, in this regard, refer, if necessary, to U.S. Pat. No. 6,208,182, with regard, in particular, to the control of the ring oscillator. However, the general principles thereof are recalled here. The control circuit CCD comprises means for comparing samples pairwise, so as to determine whether a state transition has occurred in a time interval separating the two samples, this comparison being performed over at least two cycles, consecutive or otherwise, of the ring oscillator. This comparison is performed in such a way that:

if, during the second cycle, a comparable state transition is detected in the same interval, the control of the ring oscillator is not modified, if, during the second cycle, a comparable state transition is detected in a later interval, the period of the ring oscillator is decreased, and if, during the second cycle, a comparable state transition is detected in an earlier interval, the period of the ring oscillator is increased.

Figure 8:
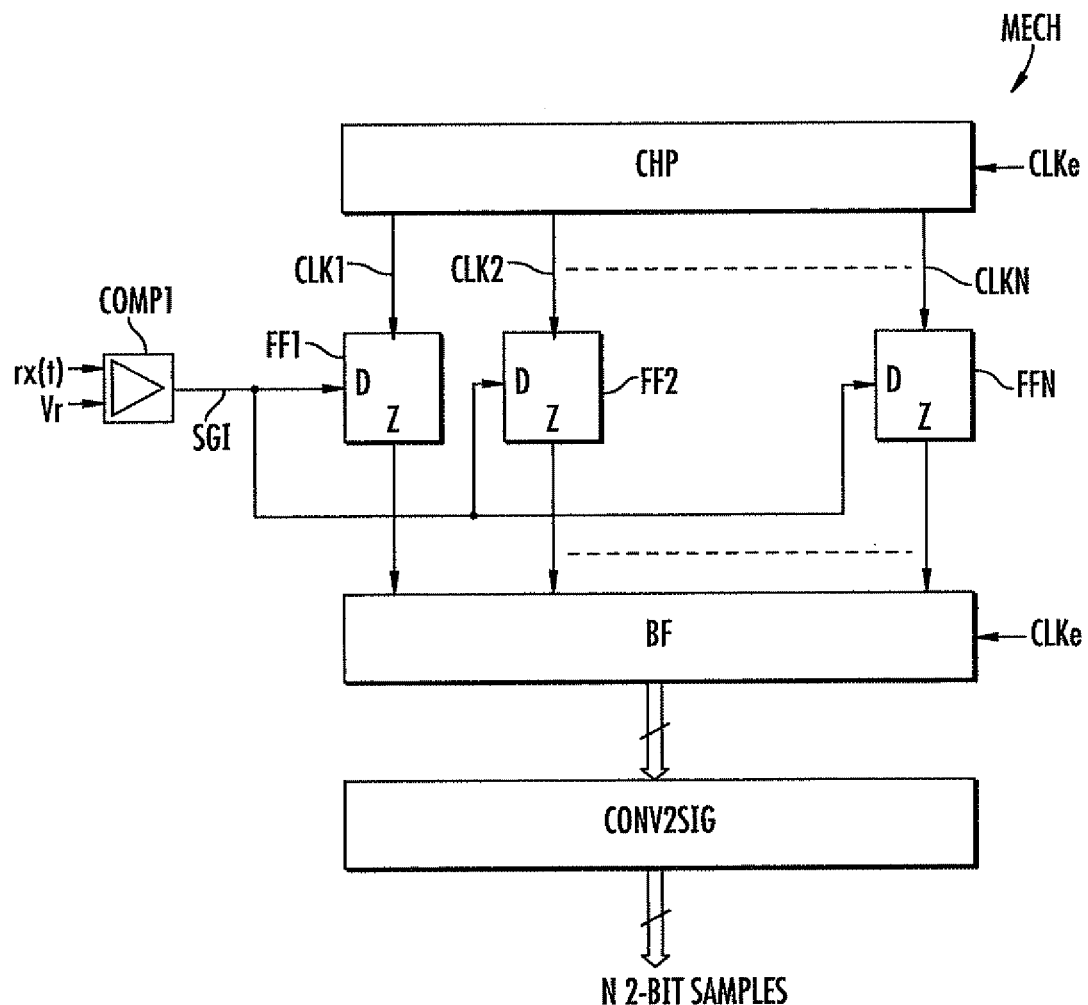
Figure 9:
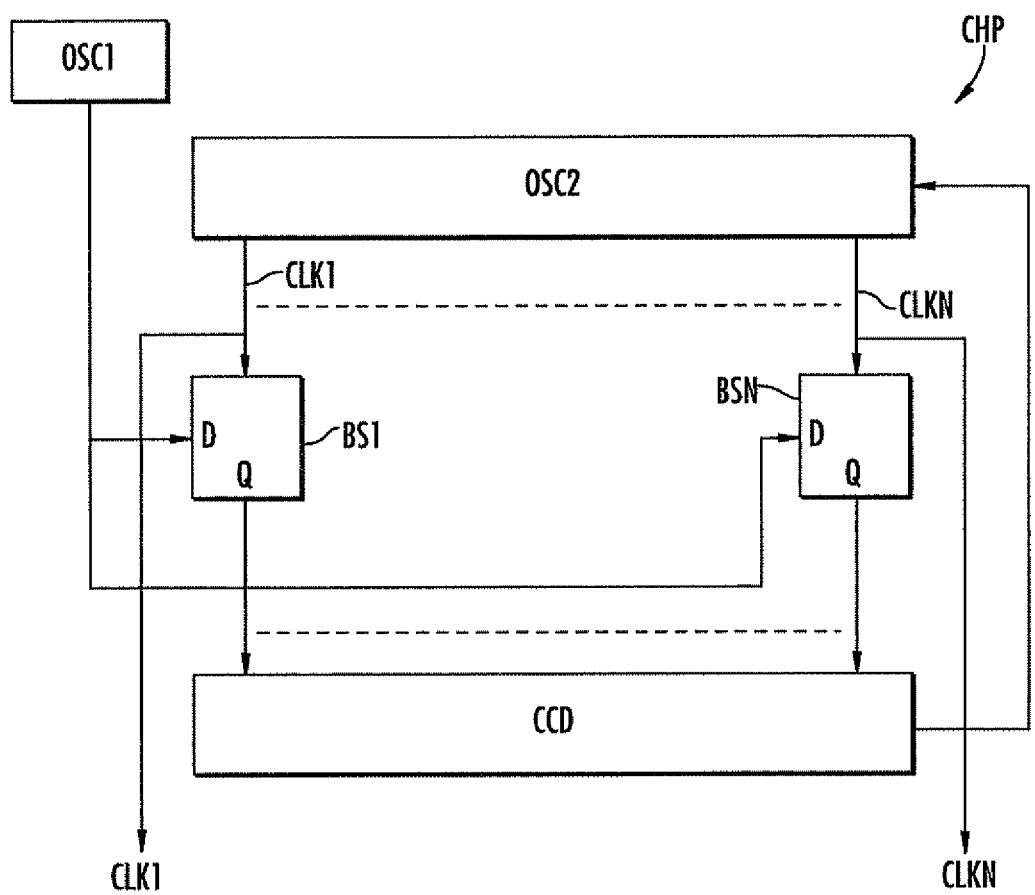

Of course, the programmable clock circuit CHP, which was described with reference to FIGS. 8 and 9 may also be used to generate the various signals for clocking the bank of N analog-digital converters discussed above. The sampling means MECH also comprises in the present case N blocks CONV2SIG, each converting the sample received as input into a sample of two bits (a sign bit and a data bit).

More precisely, if the sample received as input has the value 0, the two sign and data bits equal 0. If the value of the input sample is +1, then the sign bit is equal to 0 and the data bit is equal to 1 whereas if the sample received as input has the value −1, both the sign and data bits are equal to 1. The output of the sampling means MECH therefore delivers in the example described here successive groups of N samples of 2 bits.

Figure 10:
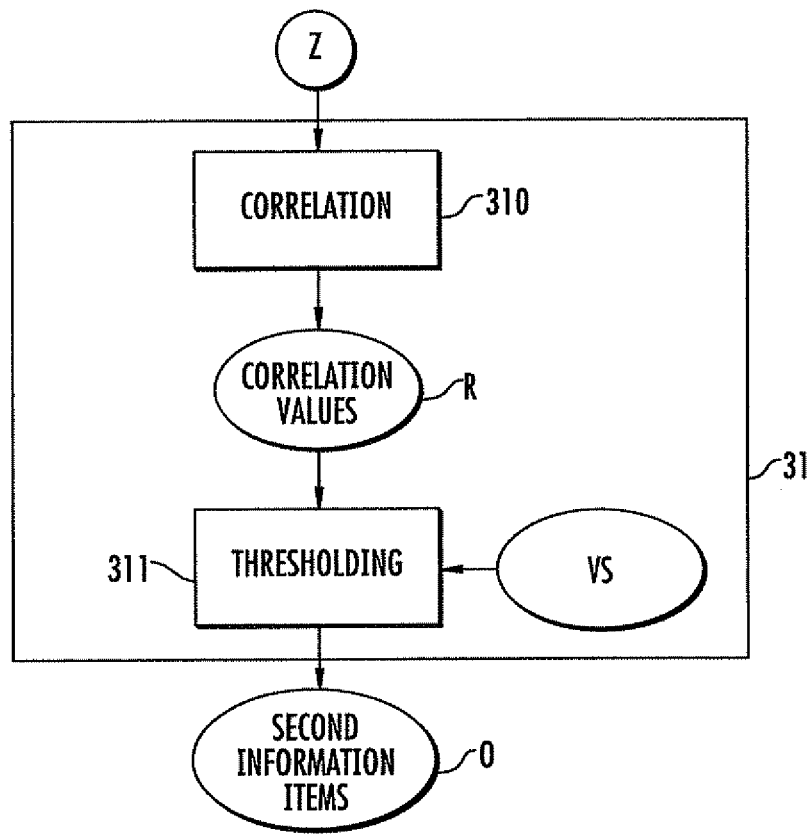
Figure 11:
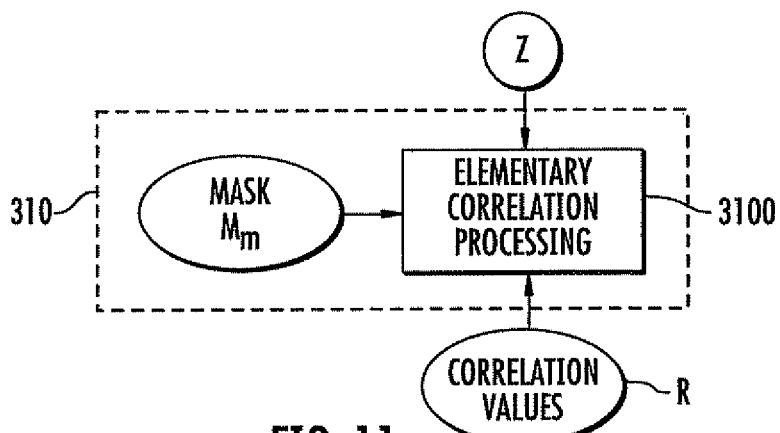

With reference made more particularly to FIG. 10, it may be seen that the second processing 31 performed on the sampled signal Z comprises a correlation processing 310 delivering correlation values, followed by thresholding processing 311 on these correlation values using a threshold value VS. Additionally, in this variant embodiment and implementation, the correlation processing 310 comprises a single elementary correlation processing 3100 (FIG. 11), using a single correlation mask $M_m$. This elementary correlation processing 3100 delivers initial correlation values which are, in this embodiment and implementation, the correlation values R.

Figure 12:
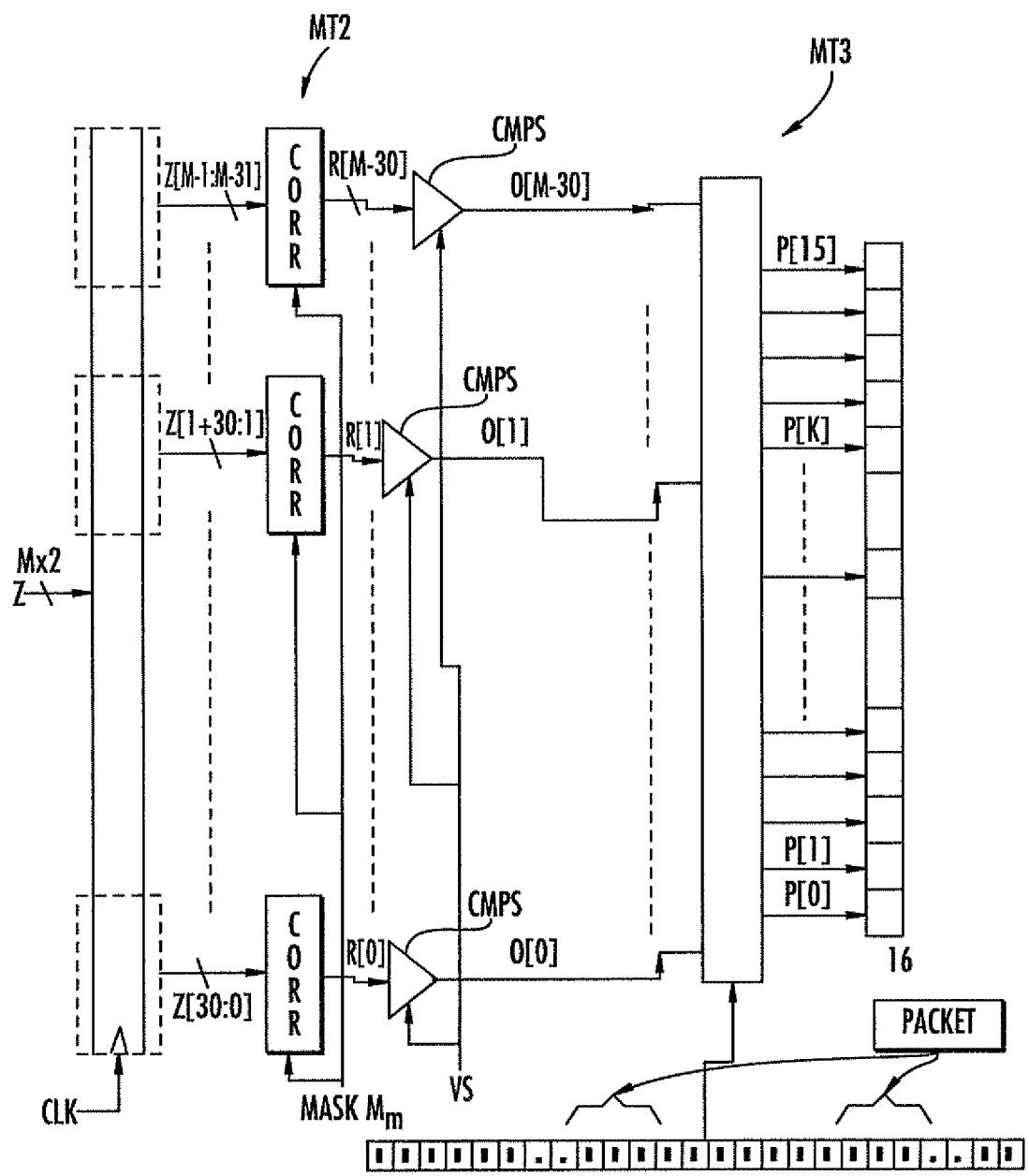

As may be seen more particularly in FIG. 12, the elementary correlation processing 3100 here comprises N correlations in parallel performed respectively by N two-bit correlators CORR. These N parallel correlations are performed on each group of $N+M_{m-1}$ samples with the correlation mask $M_m$. As illustrated in FIG. 12, each correlator performs the correlation between groups Z[i+30:i] of 31 samples and 31 mask samples also coded on two bits. The number 31 corresponds to the size of the correlation mask. N correlation values R[0]-R[M-30] are thus obtained, that is to say R[0]-R[255](N=256). The correlation values can take any integer value between 0 and the size of the mask, that is to say 31, and are consequently coded on 5 bits here.

Each correlation performed by the two-bit correlator CORR may be obtained by a bitwise multiplication series. It is also possible to use as a variant an operation C correlating two values x and y coded on two bits and defined by the following formula.

$$C(x,y)=\overline{x_1 \oplus y_1} \cdot \overline{x_0 \oplus y_0}, \text{ where } x=\{x_1,x_0\} \text{ and } y=\{y_1,y_0\}$$

The N correlation values R[i] are then threshold in thresholding means, formed of N comparators CMPS using a threshold value VS.

For example, it is possible to choose a threshold value VS equal to 70% of the correlation maximum. The thresholding means or circuitry CMPS then delivers successive groups of N threshold values O[i] (FIG. 12) which here form the N second information items. For i varying from 0 to N−1, O[i] is equal to 1 if R[i] is greater than VS and equal to 0 otherwise. The detection of the pulses may be performed on the successive groups of N threshold values O.

This detection may be performed by packets separated by a duration related, in a general manner to the discrete random parameter involved in the modulation of the signal. In the particular example of a DPIM modulation the discrete random parameter is the time interval separating two pulses, and the duration is equal to the base duration $T_{mod}$.

Indeed, a pulse appears at an integer multiple of this base duration $T_{mod}$, so that starting from the moment at which the position of a first pulse is known, there may or may not be a pulse every $T_{mod}$, i.e. every K second information items, K being equal to the ratio $T_{mod}/Te$ between the base duration and the sampling period. And, theoretically, nothing but noise may be situated around these positions. This is the reason why it is possible to process the detection packet-wise, addressing only certain positions (K in number) in the bus of the N threshold values.

Thus, not seeking to identify a pulse outside of these zones or packets amounts to circumventing errors due to the channel, and thus makes it possible to improve the digital device in terms of time and space. Apart from the circumventing disturbing terms outside of the packets, this method possesses an additional advantage as compared with a correlation performed using the correlation function C mentioned hereinabove. Indeed, such a correlation accommodates a bit value including the value 0 so that, in the absence of channel noise, the correlation value between two pulses may not be 0, and could disturb the detection according to the shape of the correlation mask. This risk of disturbance is reduced with the present approach by using packet-wise detection, which makes a provision to look at the values of the threshold correlations at defined positions rather than elsewhere.

Figure 13:
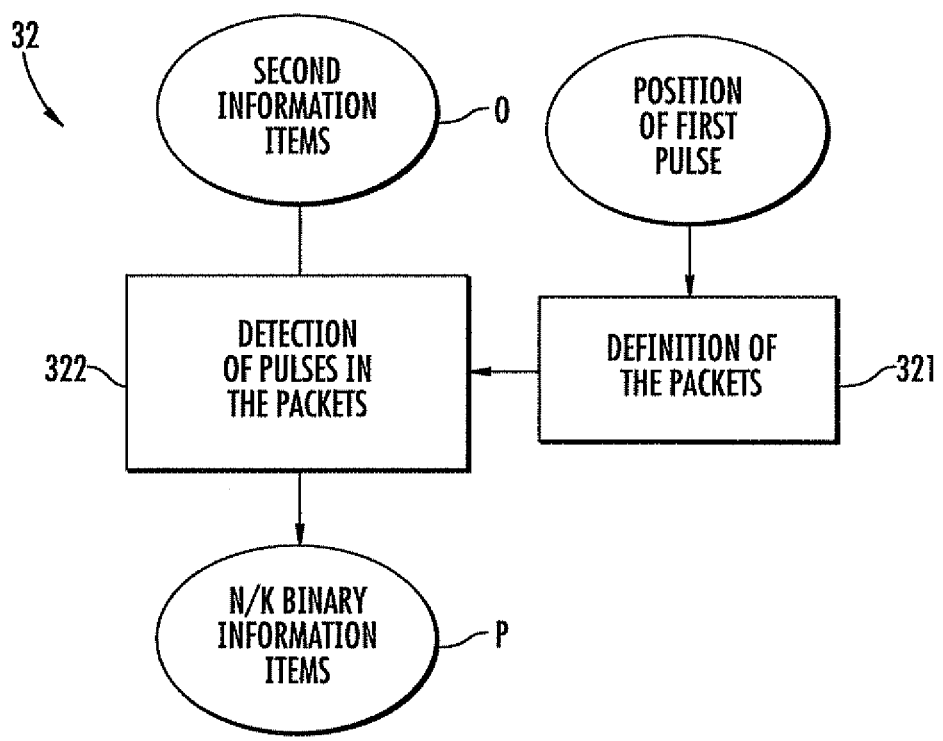

As illustrated in FIG. 13, the third detection processing 32 therefore comprises a definition of the packets (step 321) based on the position, known or detected, in the pulse train. This first pulse is not necessarily the very first pulse of the pulse train, but a first pulse which is detected by synchronization processing that may comprise, for example, a correlation processing such as that mentioned hereinabove and a detection of the position of the pulse, by detecting a 1 logic value in the group of N threshold values. This detection may be performed here not packet-wise, but on the whole of the databus.

This first pulse thus detected may form part, for example, of a synchronization preamble of the pulse train preceding the pulses representative of the actual information or data.

The definition of the packets 231 is then performed for example as follows. The packets are shifted by K second information items, which implies that for K second information items, there exists a packet of q second information items in which it may be sought to determine whether or not there has been a valid correlation peak.

On the basis of the position of the first pulse detected, the theoretical positions of the packets are determined. Additionally, the number q of second information items in each packet may be equal to 1. In practice, with regard to the risks of shifting of a correlation peak by a few samples, it may be preferable to adopt a tolerance ϕ for the detection. Stated otherwise, the size q of the packet will be equal to 2ϕ+1.

These N/K packets P define, for each block, a bus P[k], (k varying, for example, from 0 to (N/K)−1) of N/K binary information items respectively representative of N/K possible positions of the pulses. The logic value of a binary cue P(k) of this bus P defines the presence or the absence of a pulse at the corresponding position.

FIGS. 14 to 16 illustrate an exemplary implementation. It is assumed for this example that N is equal to 256 and K is equal to 16. A tolerance ϕ=3 is also assumed, this implying a packet size q equal to 7. Hence, 16 packets of 7 threshold values from among the 256 threshold values of the block are defined in each block of N threshold values O[i].

If a first pulse has been detected at the level of the position 23 in the block of 256 threshold values, then, with regard to the DPIM modulation, the possible positions of the pulses are shifted by 16 threshold values. Thus, the set POS of possible positions of the pulses within each block of 256 threshold values O[i] is defined by the array of FIG. 14.

Hence, it is therefore possible to define on the basis of this array POS, an array TB (FIG. 15) representative of the packets P(k) for the detection.

Columns of the array TB represent packets. Packets are centered around the possible theoretical position, and have a size equal to 7 samples. It is assumed, moreover, that in a block of N threshold values O[i], the values are zero except those for i=71, 118, 185, 194 and 247.

Given that the detection is performed on the packets defined in the array TB, no account is taken of the threshold value situated at the position 194. The latter is probably representative of channel noise. The other threshold values equal to 1 are situated in packets P(4), P(7), P(11) and P(15). Consequently, these packets are assigned a binary cue equal to 1 whereas the other packets are assigned a binary cue equal to 0.

Thus, for this considered block of threshold values, the bus P representative of the pulses detected in this block of threshold values has the configuration represented in FIG. 16. Stated otherwise, only four pulses have been detected among the possible pulse positions. The gap between these detected pulses may thereafter allow the decoding of the data.

The amplitude of a signal decreases in the transmission channel as the distance between the emitter and the receiver increases. An approach for remedying this drawback includes supplementing the device with automatic gain control, making it possible to preserve for distances an amplitude that is compatible with a good analog-digital conversion.

Figure 17:
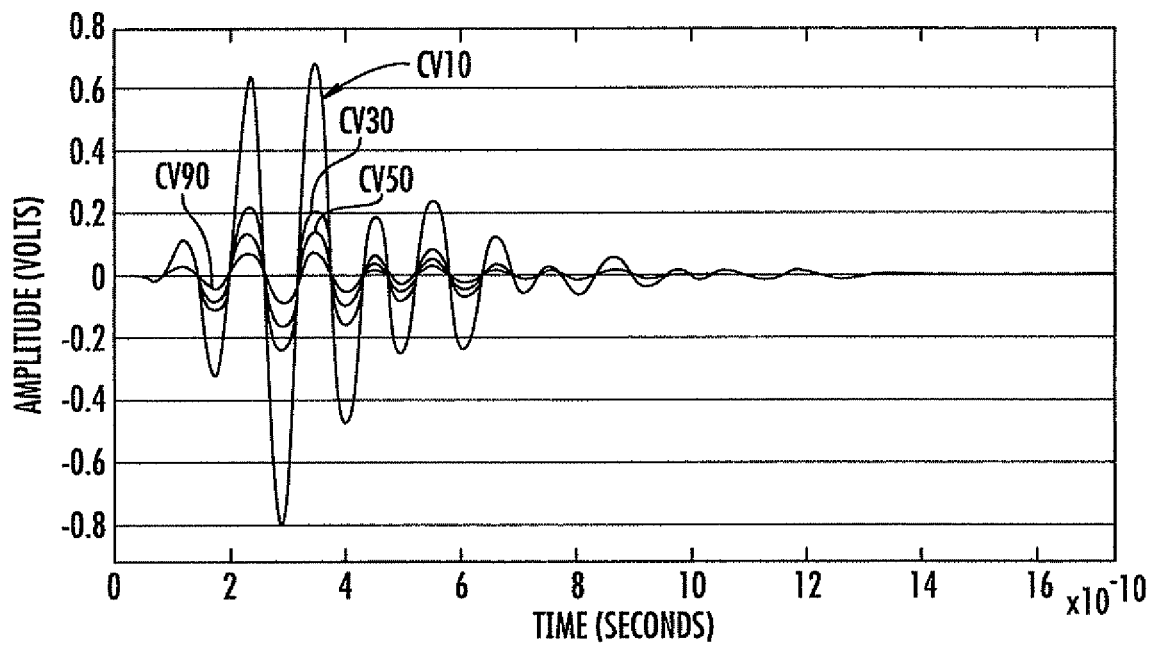
FIGS. 17 to 20 illustrate another variation of a method and a device taking account of the distance between an emitter and a receiver, in accordance with the present invention.

Another approach, making it possible to circumvent the signal amplitude variation problems due to the emission distance, and to also dispense with an automatic gain controller, is illustrated by way of example in FIGS. 17 to 20. In FIG. 17, are represented various pulse shapes received at the level of the receiver REC, for emission distances DD (FIG. 1) varying from 10 cm to 100 cm. A decrease in the amplitude of these various pulses is observed. Thus, curve CV10 represents the shape of a pulse for a distance DD of 10 cm. Curve CV30 represents the shape of a pulse for a distance DD of 30 cm.

Curve CV50 represents the shape of a pulse for a distance DD equal to 50 cm and curve CV90 represents the shape of a pulse for a distance DD equal to 90 cm. A correlation mask corresponding to at least part of the corresponding sampled shape of a pulse is then defined for these pulse shapes, and the intercorrelations between the various correlation masks and the various shapes of sampled pulses are performed. Next, the evolution of the maxima of these intercorrelations is examined.

Figure 18:
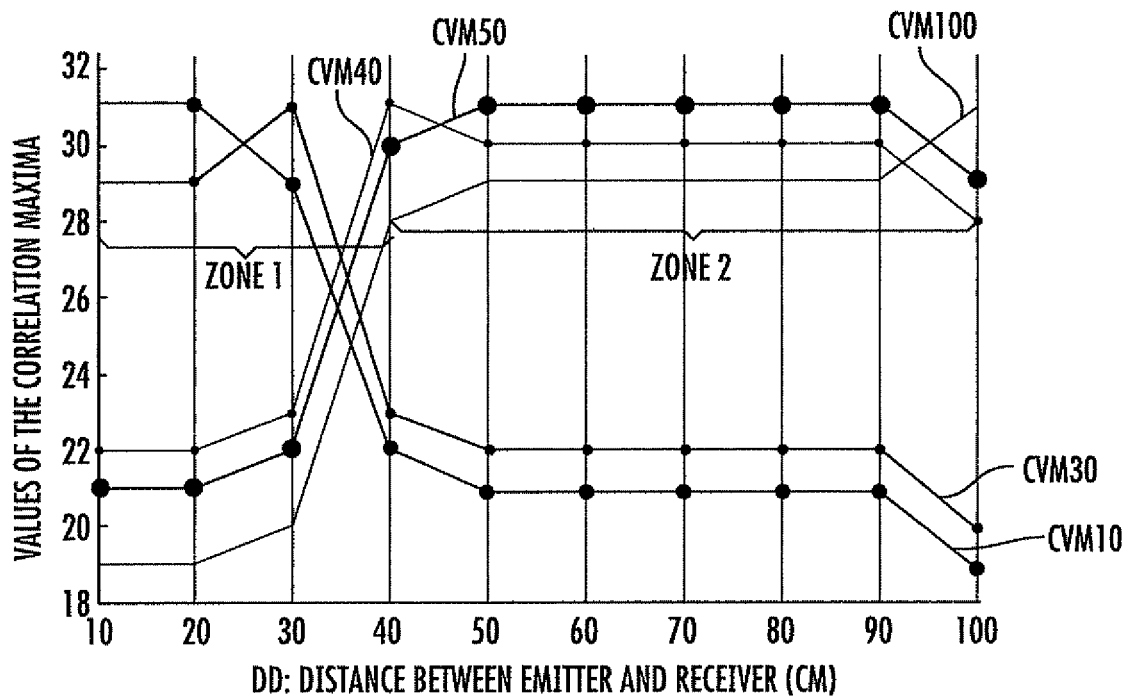

These evolutions are presented in FIG. 18. Thus, curve CVM10 represents the evolution of the intercorrelation maxima using masks associated with a distance DD equal to 10 cm and a distance DD equal to 20 cm. Curve CVM30 illustrates the evolution for a mask associated with a distance DD equal to 30 cm. Curve CVM40 corresponds to the evolution for a mask associated with the distance DD equal to 40 cm. Curve CVM50 represents the evolution for masks associated with distances DD equal to 50, 60, 70, 80 and 90 cm. Curve CVM100 represents the evolution for a mask associated with the distance DD equal to 1 m.

These evolutions reveal two pulse groups. These two zones correspond respectively to distances of less than 40 cm and distances of greater than or equal to 40 cm.

This said, it may be seen that it may not be possible to determine a correlation mask valid for a distance lying between 10 and 40 cm, as well as another correlation mask valid for a distance lying between 40 and 100 cm.

Figure 19:
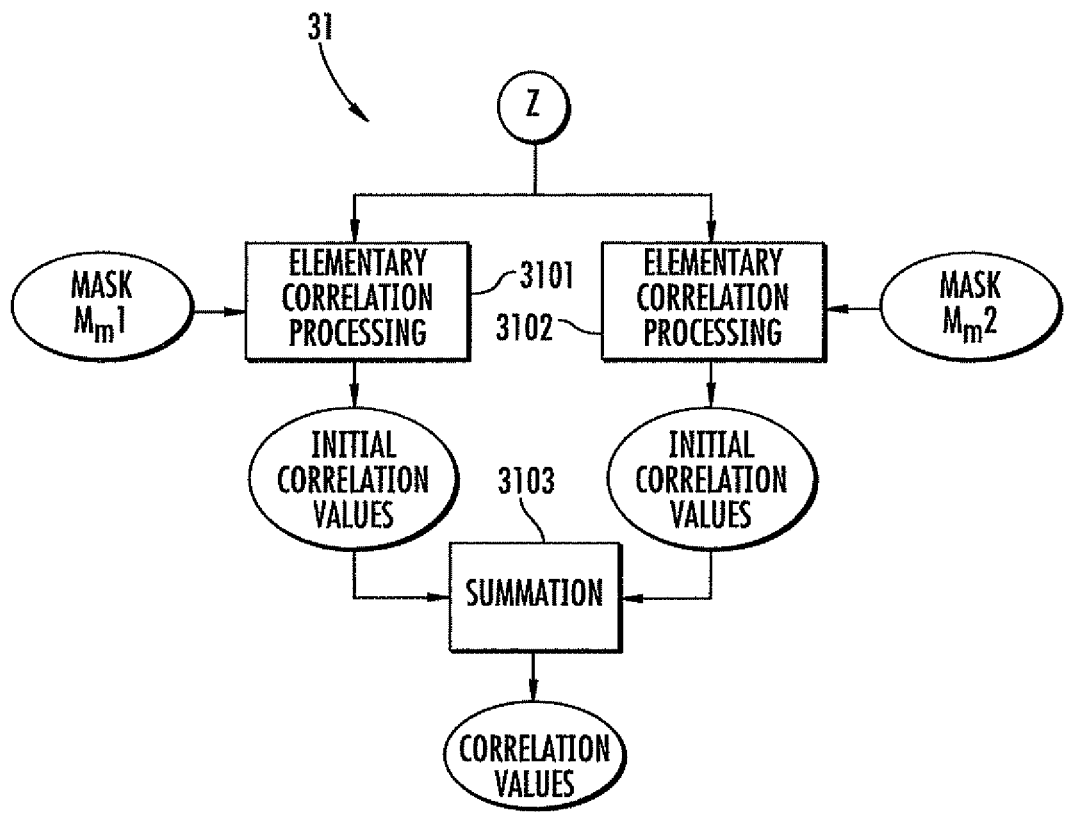

On the other hand, it may be conceivable to define two masks, the sum of the maxima of whose intercorrelations is substantially constant over an interval, including the values of the different distances considered, the distances lying between 0 and 1 meter. As illustrated in FIG. 19, the correlation processing 31 may comprise two elementary correlation processings 3101 and 3102 analogous to that described with reference to FIGS. 11 and 12, and performed respectively with the two masks $M_{m1}$ and $M_{m2}$ selected.

The homologous initial correlation values delivered by the two elementary correlation processings may then be summed (step 3103) so as to deliver the correlation values which may be used in the thresholding processing. By way of example, the mask associated with the distance DD equal to 20 cm may be chosen as first mask $M_{m1}$ and the mask associated with the distance 70 cm may be chosen as mask $M_{m2}$.

Thus, performing in parallel various elementary correlation processings respectively associated with various correlation masks so that the sum of the correlations is substantially stable over a given interval of distances, makes it possible to circumvent the amplitude variations of the signal over this distance interval, while dispensing with automatic gain control or a distance detection step combined with a selection of the mask corresponding to the distance detected.

Figure 20:
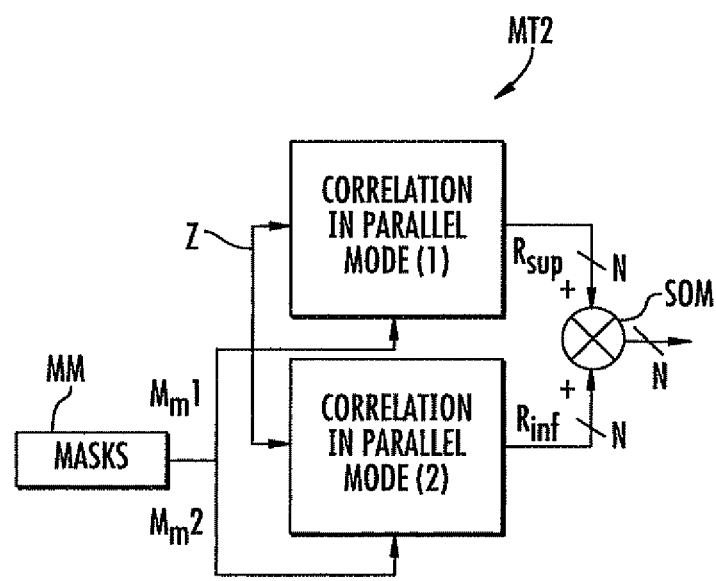

Hardware-wise, in this variant embodiment, the second processing means MT2 are, for example, those illustrated in FIG. 20. The memory MM stores the two masks defined previously. Then the correlation means, embodied in software form within the processor DSP, perform in parallel the two elementary correlation processings with the two masks $M_{m1}$ and $M_{m2}$. The correlation results $R_{sup}$ and $R_{inf}$ are summed in a summator SOM so as to give the correlation values R.

Such an approach may be generalized to A masks and A elementary correlation processings, with A greater than 2, if the distance and the waveform so require. The multiple elementary correlation processings may be performed simultaneously or one after the other after a latency time.

That which is claimed is:

1. A method of processing a pulse train of a signal modulated by a modulation based upon a discrete random time parameter, the method comprising:
   performing a first processing on the signal to produce a sampled signal;
   performing a second processing on the sampled signal by
      performing at least one correlation processing with a correlation mask to produce correlation values, the correlation mask corresponding to a shape of part of a sampled pulse,
      thresholding the correlation values with a threshold value to produce second information item corresponding to the threshold correlation values, and
      with two consecutive packets of second information items in each successive block of second information items being shifted by K second information items, with K being an integer and being based upon a ratio between a sampling period and a base duration; and
   performing a third processing to detect pulses following a first pulse by taking account of a position of the first pulse, on packets of the second information items, the packets being separated by a duration related to the discrete random time parameter, and with the third processing producing, for each successive block of N second information items, with N being an integer and with N/K binary information items respectively representing N/K possible positions of the pulses, a logic value of a binary cue defining a presence or absence of a pulse at a possible position.

2. A method according to claim 1, wherein the at least one correlation processing comprises at least one elementary correlation processing.

3. A method according to claim 1, wherein the second information items comprise binary information items corresponding to the threshold correlation values.

4. A method according to claim 3, wherein the signal is an ultra wideband signal modulated by a digital pulse interval modulation (DPIM), an interval between two pulses of the signal being an integer multiple of the base duration; wherein the first processing produces successive groups, of samples of the signal in parallel; wherein the at least one correlation processing is performed on the successive groups of samples of the signal and further produces successive blocks of correlation values; and wherein the duration comprises the base duration.

5. A method according to claim 1, wherein thresholding comprises performing thresholding operations respectively in parallel on the correlation values of each successive block with the threshold value to produce successive blocks of second information items.

6. A method according to claim 1, wherein the correlation mask comprises $M_m$ mask samples, with $M_m$ being an integer; wherein the first processing further comprises successively storing $M_m-1$ last samples of the successive groups of samples, to form a group of $N+M_m-1$ samples comprising the stored $M_m-1$ samples of a previous group followed by N samples of a current group.

7. A method according to claim 6, wherein the at least one correlation processing comprises performing N correlations in parallel on each group of $N+M_m-1$ samples with the correlation mask and delivering for each group of $N+M_m-1$ samples a block of N initial correlation values.

8. A method according to claim 7, wherein the correlation values comprise the initial correlation values.

9. A method according to claim 3, wherein a shape of pulses of the signal varies based upon a distance from where the signal was emitted; wherein the correlation mask comprises a plurality of correlation masks; wherein the plurality of correlation masks corresponds respectively to part of sampled pulses of the signal respectively emitted at distances of different values, a sum of maxima of intercorrelations performed respectively between the plurality of correlation masks and the shapes of sampled pulses remaining similar over an interval including values of each distance; and wherein performing at least one correlation processing comprises performing a plurality of correlation processings respectively with the plurality of correlation masks and each producing initial correlation values; and further comprising performing a summation of the initial correlation values to obtain the correlation values.

10. A device for processing a pulse train of a signal modulated by modulation based upon a discrete random time parameter comprising:
   circuitry to perform a first processing on the signal to produce a sampled signal;
   circuitry to perform a second processing on the sampled signal by
      performing at least one correlation processing with a correlation mask to produce correlation values, the correlation mask corresponding to a shape of part of a sampled,
      thresholding the correlation values with a threshold value to produce a second information item corresponding to the threshold correlation values, and
      with two consecutive packets of second information items in each successive block of second information items being shifted by K second information items, with K being based upon a ratio between a sampling period and the base duration; and
   circuitry to perform a third processing to detect pulses following the first pulse by taking account of a position of the first pulse, on packets of the second information item, the packets being separated by a duration related to the discrete random time parameter, and with the third processing producing, for each successive block of N second information items, N/K binary information items respectively representing N/K possible positions of the pulses, a logic value of a binary cue defining a presence or absence of a pulse at a possible position.

11. A device according to claim 10, wherein the at least one correlation processing comprises at least one elementary correlation processing.

12. A device according to claim 10, wherein the second information item comprises a binary information item corresponding to the threshold correlation values.

13. A device according to claim 12, wherein the signal is an ultra wideband signal modulated by a digital pulse interval modulation (DPIM), an interval between two pulses of the signal being an integer multiple of a base duration; wherein the first processing produces successive groups of samples of the signal in parallel; wherein the at least one correlation processing is performed on the successive groups of samples of the signal and further produces successive blocks of correlation values; and wherein the duration comprises the base duration.

14. A device according to claim 10, wherein thresholding comprises performing thresholding operations respectively in parallel on the correlation values of each successive block with the threshold value to produce successive blocks of second information items.

15. A device according to claim 10, wherein the correlation mask comprises $M_m$ mask samples; wherein the first processing further comprises successively storing $M_m-1$ last samples of the successive groups of samples, to form a group of $N+M_m-1$ samples comprising the stored $M_m-1$ samples of a previous group followed by N samples of a current group.

16. A device according to claim 15, wherein the at least one correlation processing comprises performing N correlations in parallel on each group of $N+M_m-1$ samples with the correlation mask and delivering for each group of $N+M_m-1$ samples a block of N initial correlation values.

17. A device according to claim 16, wherein the correlation values comprise the initial correlation values.

18. A device according to claim 12, wherein a shape of pulses of the signal varies based upon a distance from where the signal was emitted; wherein the correlation mask comprises a plurality of correlation masks; wherein the plurality of correlation masks corresponds respectively to part of sampled pulses of the signal respectively emitted at distances of different values, a sum of maxima of intercorrelations performed respectively between the plurality of correlation masks and the shapes of sampled pulses remains similar over an interval including values of each distance; and wherein performing at least one correlation processing comprises performing a plurality of correlation processings respectively with the plurality of correlation masks and each producing initial correlation values; and further comprising performing a summation of the initial correlation values to obtain the correlation values.

19. A device according to claim 10 wherein the circuitry to perform a first processing, circuitry to perform a second processing, and circuitry to perform a third processing define a wireless receiver.

20. A device for processing a pulse train of a signal modulated by modulation based upon a discrete random time parameter comprising:
   circuitry to perform a first processing on the signal to produce a sampled signal; and
   a digital signal processor to at least
      perform a second processing on the sampled signal by
         perform at least one correlation processing with a correlation mask to produce correlation values, the correlation mask corresponding to a shape of part of a sampled,
         threshold the correlation values with a threshold value to produce a second information items corresponding to the threshold correlation values, and
         with two consecutive packets of second information items in each successive block of second information items being shifted by K second information items, with K being an integer and being based upon a ratio between a sampling period and the base duration, and
      perform a third processing to detect pulses following the first pulse by taking account of a position of the first pulse, on packets of the second information items, the packets being separated by a duration related to the discrete random time parameter, and with the third processing producing, for each successive block of N second information items, with N being an integer and with N/K binary information items respectively representing N/K possible positions of the pulses, a logic value of a binary cue defining a presence or absence of pulse at a possible position.

21. A device according to claim 20, wherein the at least one correlation processing comprises at least one elementary correlation processing.

22. A device according to claim 20, wherein the second information items comprise binary information items corresponding to the threshold correlation values.

23. A device according to claim 21, wherein the signal is an ultra wideband signal modulated by a digital pulse interval'modulation (DPIM), an interval between two pulses of the signal being an integer multiple of the base duration; wherein the first processing produces successive groups of samples of the signal in parallel; wherein the at least one correlation processing is performed on the successive groups of samples of the signal and further produces successive blocks of correlation values; and wherein the duration comprises the base duration.

24. A device according to claim 20, wherein said circuitry to perform said first processing on the signal and said digital signal processor define a wireless receiver.

* * * * *